Nov. 24, 1959  B. W. BENTZ  2,914,200
BOAT TRAILER
Filed Jan. 9, 1958  3 Sheets-Sheet 1
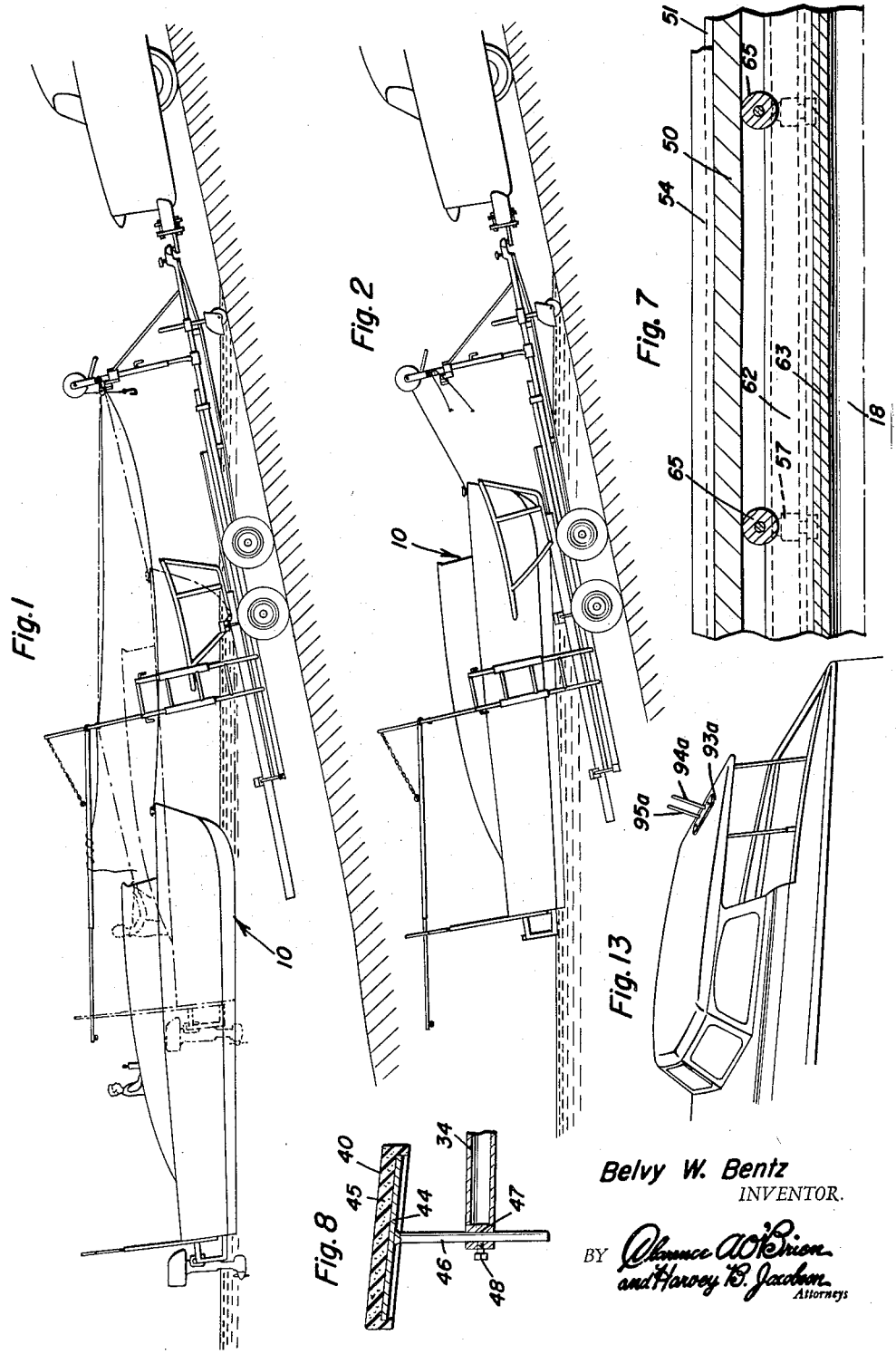
Belvy W. Bentz
INVENTOR.

Nov. 24, 1959     B. W. BENTZ     2,914,200
BOAT TRAILER
Filed Jan. 9, 1958     3 Sheets-Sheet 2
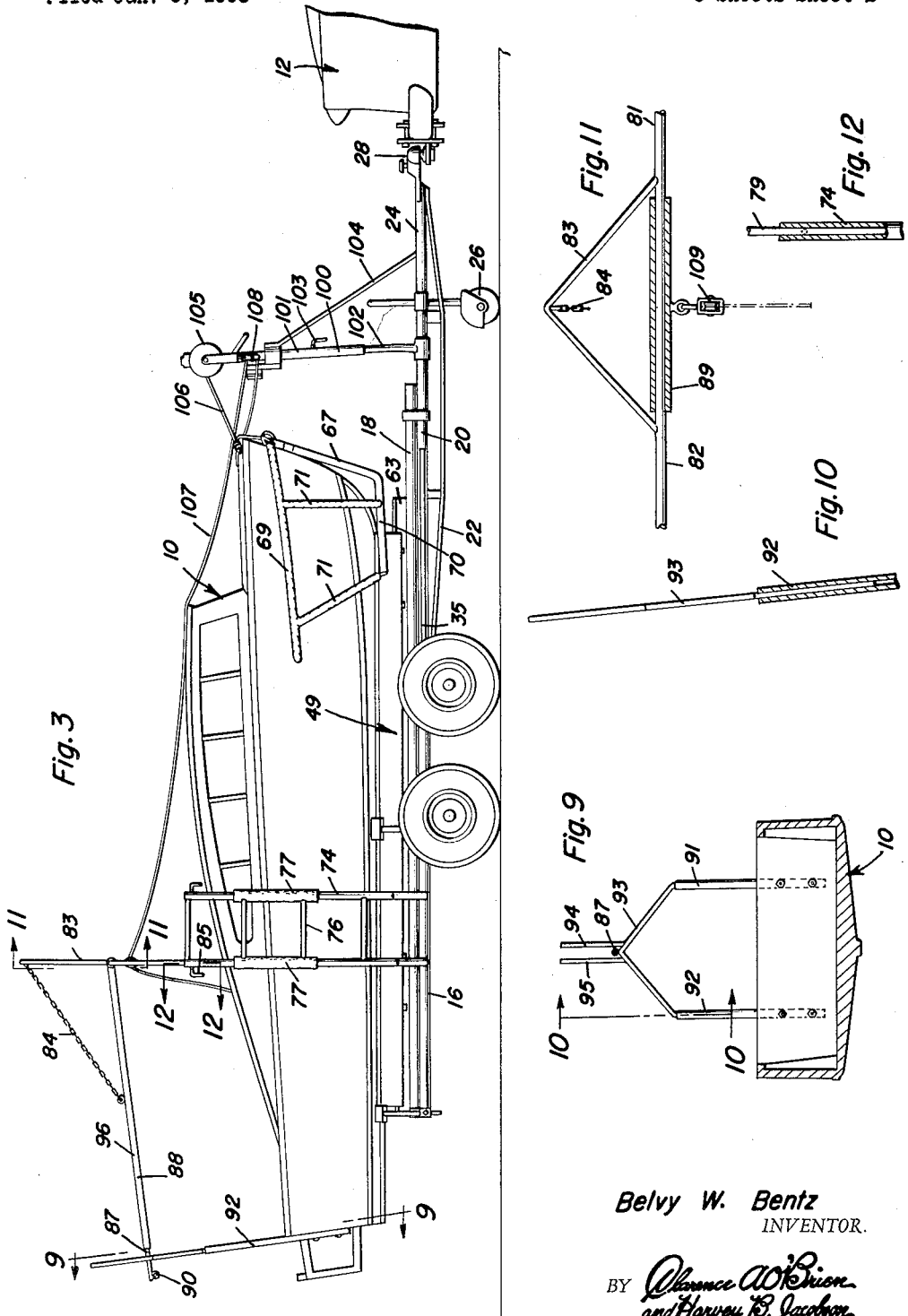
Belvy W. Bentz
INVENTOR.

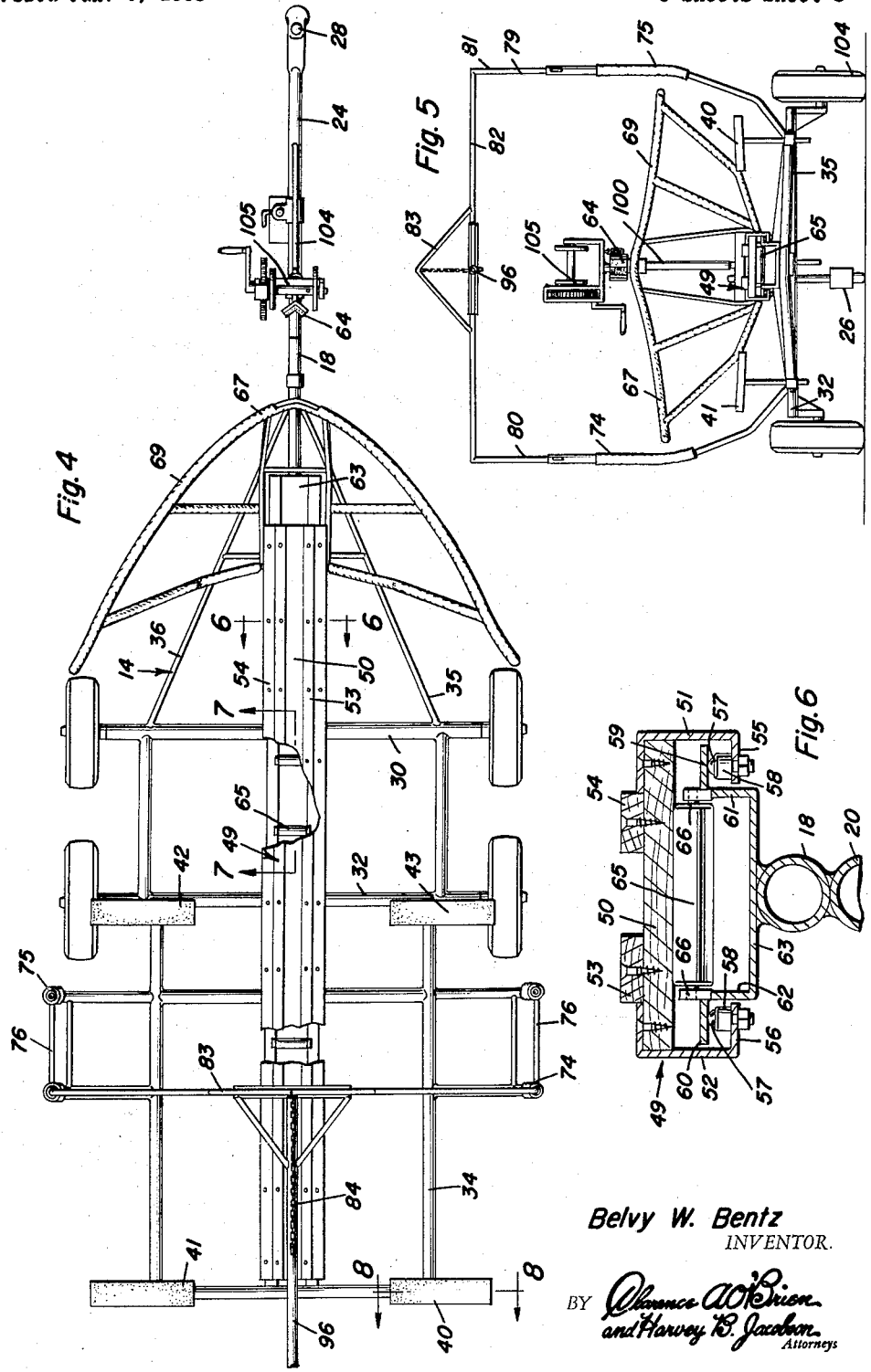

United States Patent Office 2,914,200
Patented Nov. 24, 1959

2,914,200

BOAT TRAILER

Belvy W. Bentz, Vernon, Tex.

Application January 9, 1958, Serial No. 708,021

3 Claims. (Cl. 214—84)

This invention relates to a boat trailer and particularly to a boat trailer by which loading and unloading the boat is facilitated.

A large number of boat trailers are commercially available at the present time. A much greater number of boat trailers have been described, patented and tried. In no case has there been, to my knowledge, a boat trailer of the type capable of handling boats to about 30 feet, but more generally between 16 and 26 feet, where the launching and loading of a boat can be accomplished without a great deal of effort. So many factors enter into the problem that a boat trailer which is good in shallow water or with a gentle grade, is not ordinarily satisfactory where the grade is steep, the water rough or deep. It is the primary object of this invention to provide a practical boat trailer which materially decreases the effort involved in both loading and launching.

A further object of the invention is to provide a trailer where the chassis thereof has a carriage movable in the forward and rearward direction and upon which the bottom, usually, the keel, of the boat bears when the boat is pulled up onto the trailer by a rope which can be pulled by a person on the boat or on shore. The stern of the boat has to be controlled and aligned in the track for it when the boat is being loaded, otherwise the boat stern will not ride in center position on the movable carriage. My colleagues who have invented prior trailers have not, to my knowledge, taken care of this difficulty.

Therefore, it is a further object of my invention to provide a guide assembly for the stern or stern part of the boat. The guide becomes effective when the boat is moved sufficiently far into the trailer to warrant guiding the stern as the bow is being pulled onto the trailer chassis.

A further object of my invention is to provide a trailer for a boat, the trailer facilitating loading and launching of the boat by having a movable carriage on which the boat is supported during loading and launching operations and upon which the boat rides after it has been loaded. A cradle to guide the bow of the boat is attached to forward end of a movable carriage platform. Before loading is started, carriage platform with attached cradle is moved on its rollers into the water until cradle contacts, or comes close to upright stanchions located on each side of the trailer chassis. With chassis at an angle of inclination, as is the case during normal loading and launching, the boat is guided between these upright stanchions and forward into the cradle. The cradle both guides and centers forward keel on the trailer.

My trailer has a novel carriage that is arranged to move in a rectilinear path on the chassis whereby both the bow and the stern parts of the boat are correctly centered on the trailer with the least possible effort. The carriage includes further a centering device for the stern. By means of an overhead telescoping beam placed in a socket provided for it over the stern section, the boat is almost exactly centered on the trailer. The carriage has a padded cradle at its front end within which to accommodate the bow of the boat.

These together with other objects and features of importance will become apparent in following the description of the illustrated forms of the invention.

Figure 1 is an elevated view showing the trailer just as it is receiving the boat and in dotted line position, the boat as it approaches the carriage cradle of the trailer.

Figure 2 is an elevated side view similar to Figure 1 showing the boat as it moves with the carriage to a forward position on the chassis of the trailer.

Figure 3 is a side view of the trailer loaded with a boat and ready for transit.

Figure 4 is a fragmentary top view of the trailer of Figure 3 with the boat removed.

Figure 5 is a front view of the trailer in Figure 4.

Figure 6 is an enlarged sectional view of the carriage and taken on the line 6—6 of Figure 4.

Figure 7 is an enlarged sectional view of the carriage and taken on the line 7—7 of Figure 4.

Figure 8 is an enlarged sectional view of one of the padded supports and taken on the line 8—8 of Figure 4.

Figure 9 is an enlarged sectional view of a flagstaff support within which a part of the stern guide assembly is separably mounted and taken on the line 9—9 of Figure 3.

Figure 10 is an enlarged sectional view taken on the line 10—10 of Figure 9.

Figure 11 is an enlarged sectional view of a part of the stern guide and taken on the line 11—11 of Figure 3.

Figure 12 is a sectional view on enlarged scale showing the adjustable connection between one stanchion and a part of the stern guide assembly.

Figure 13 is a fragmentary perspective view of a boat that is provided with a modification of the stern guide assembly.

The boat 10 and automobile 12 in the accompanying drawings are conventional. The boat that is illustrated is a 20 foot outboard motor powered boat but schematically represents any type of boat and of any size within the practical limits of boats that are capable of being handled by boat trailers. The illustration in Figure 3 has the boat 10 overhanging the trailer a small amount, but should approximate the full length of the boat varying in accordance with the boat size that is being handled.

My trailer 14 has a chassis 16 made of two main spars 18 and 20 which are held together with a collar which circles spars 18 and 20. This collar is made to slip forward and off spar 18, thus permitting forward carriage to tilt upwards lifting front end of the boat and at the same time lowering rear end of the boat for easier loading and launching in shallow water. For smaller boats and medium size boats, spar 18 may be shortened to a few feet in length by welding end to carriage 49, thus eliminating a full length spar. This arrangement may also be used on larger boats by strengthening chassis slightly.

Dolly wheel 26 is adjustably mounted at the front of the chassis and behind the conventional trailer hitch 28 by which to connect to a motor vehicle 12. Transverse beams 30 and 32 are secured to the main spars of the chassis and they constitute a part of a generally rectangular frame 34 that has a number of braces further connecting it to the main spars of the chassis. Among these braces are diagonal braces 35 and 36 connected to beam 30 and to the main spars. Aft supports 40 and 41 are attached at the rear corners of frame 34. Additional supports 42 and 43 are connected in a similar manner to an intermediate frame 34. Each support is constructed very much alike and a typical support is shown in Figure 8. It is made of a plate 44 on which there is a pad 45. Post 46 is fixed to plate 44 and is passed through socket 47 of frame 34. Setscrew 48, pin or like fastener is operatively connected with post 46 to hold the support 40 at a selected elevation.

Carriage 49 is carried by channel 63 which is affixed and supported by the chassis main spar 18. Carriage 49 is movable in the forward and rearward direction on channel 63. Carriage 49 is made of a plank 50 with confronting channels 51 and 52 fastened to its longitudinal edges and elongated cleats 53 and 54 secured to the top surface of the plank 50 with a space between them. This space is to receive the keel of the boat and therefore it is preferred that the cleats be made of wood or some other material that would not easily damage the boat keel or bottom. The lower sides 55 and 56 of channels 51 and 52 have balls 57 in sockets 58, rollers or other anti-friction bearings thereon. These abut a pair of lateral flanges 59 and 60 which protrude from sides 61 and 62 of channel 63. This channel extends along the longitudinal axis of the trailer and is welded or otherwise fastened to the spar 18. Therefore bearings 57 and flanges 59 and 60 constitute means by which to prevent bind or torsion during either forward or rearward movements of the overriding carriage 49 which supports and carries the boat, and also prevents carriage 49 from separating from the trailer chassis. During loading, weight of boat first rests on forward end of the carriage 49 which tends to lift rear end of carriage 49. Bearings 57 are designed to prevent this lifting of the platform of carriage 49. Housing sockets 58 for steel bearing balls 57 have openings or vents for greasing with a grease gun. Elongated rollers with waterproof bearings may be substituted in place of ball type bearings. A cushioned stop 64 is carried by support 100 to prevent the bow of the boat from marring or damage when loading.

A plurality of transverse rollers 65 are mounted on waterproof bearings 66 on the sides 61 and 62 of channel 63. These rollers form a seat for the bottom surface of plank 50 and enable the carriage to move smoothly and easily forwardly or rearwardly of the trailer.

A cradle 67 is at the front of the carriage and is constructed in such a manner as to receive the bow of the boat. The cradle is made of an upper generally angular rail 69 from which uprights 71 depend, and these are secured to the bottom 70 of the cradle. This cradle bottom is secured to the front of the carriage.

A pair of stanchions 74 and 75 that have lower ends which curve inwardly to joint to and securely fasten to frame 34, extend upwardly. They have rungs 76 so that they can be used as ladders and they have padding 77 to prevent damage to the finish of the boat. The upper ends of the stanchions 74 and 75 are hollow (Figure 12) in order to receive the legs 79 and 80 of frame 81. The frame is U-shaped and it includes a cross member 82 that connects to the sides 79 and 80. It is adapted to straddle the boat and has an upstanding bracket 83 to which chain 84 is secured. Locking devices, for example setscrews 85 are threaded into the sides of the stanchions 74 and 75 and engage the sides 79 and 80 of frame 81 to hold it in a selected position. A beam that is extensible and formed of telescoping parts 87 and 88, has its inner end rigidly attached to a sleeve 89 which is pivoted on the cross member 82 of frame 81 and between the sides of the angular bracket 83. The beam and the means to support the beam in the stanchion coupled with the structure in Figure 9 or in Figure 13, constitute means by which to guide the stern or the stern portion of the boat as it is being loaded. An eye 90 is at the extremity of the beam for general purposes.

Two tubes 91 and 92 which can double as flagstaff supports, are attached to the transom of the boat and have a yoke 93 separably mounted in them. The yoke has its sides fitted into the bores of the tubes 91 and 92 and has a pair of parallel arms 94 and 95 thereon between which the part 87 of beam 96 is fitted. The embodiment of Figure 13 differs from that of Figure 3 in that the parallel arms 94a and 95a are on the base plate 93a instead of the yoke, and the base plate is bolted or otherwise fastened to a convenient part of the boat near the stern or at least, more toward the stern than the bow of the boat. When the boat is in transit, section 93 is telescoped into section 92, Figure 10.

A support 100 which is extensible by having sleeve 101 fitted over rod 102 and held in selected positions by setscrew 103, is rigidly fixed to the main spar of the chassis. Brace 104 extends from support 100 to the tongue 24 helping to support the tongue and to strengthen the support 100. Winch 105 is at the top of support 100 and has a rope 106, cable or the like attached to it and preferably provided with a hook for the cleat at the front of the boat. Manual rope 107 is also attached to the bow of the boat and is entrained over a pulley 108 carried by support 100. This rope is also entrained over a pulley 109 that is suspended from an eye or sleeve 89. The rope terminates near the boat pilot.

In operation, it is assumed that the boat is in the water. The boat pilot steers the boat as shown in Figure 1 toward the rear end of the trailer. Beam 96 is extended and aligned with the space between the parallel rods 94 and 95. The manual rope 107 is grasped by the pilot of the boat or someone ashore or on the boat and the boat is pulled forward until the bow is received in cradle 67 of the carriage 49 (see dotted line position of Figure 1). Then the rope is pulled harder so that the carriage 49, boat 10 and cradle 67 of the carriage are moved further forward until the bow portion of the keel is nested in the carriage and the bow fitted neatly within the cradle 67.

Figures 9, 10 and 11 which operate as a unit are one of the two most important parts of this invention and cannot be stressed too much. Watch boats that are being loaded and you will find on a big majority of such operations that the most difficult part of loading a boat is centering rear keel section in center position. Many boat loaders must get into water to do this. The rear of a trailer is always under water and it is very difficult to find and then to hold after finding center position. This is much more difficult when there are waves whether formed by wind, current or by passing boats. Boats can be centered with my invention with practically no trouble at all and centering is always exact with no guess work involved. After the bow has entered the cradle section, boatman merely reaches for part 93 with one hand and with the other hand takes hold of any part of the rear hull of the boat or if within his reach he will grasp a part of the yoke section shown in Figure 9 and bring the two parts together and place part 93 in the yoke or parallel arms formed by 94 and 95, Figure 9.

The hook on the end of rope 106 is attached to the cleat at the front of the boat and further movement of the carriage plus the boat is achieved by operating winch 105. During all of these movements the beam 96 guides the stern of the boat so that the boat is correctly positioned in center of carriage 49. Thereafter the vehicle 12 can pull the trailer on its wheels 114 for transportation. A padded shoe is attached to support 100 below the winch to hold the bow firm during transportation. Weight on tongue 24 and dolly 26 can be lightened by moving boat back on its chassis a few feet making it very easy to fasten tongue 24 on bracket 28. Supports 40, 41, 42 and 43 serve to balance the boat in loading in very rough waters and for balancing the boat during transportation. The wheels are supported on the two beams 30 and 32 through an intermediate axle structure.

To unload the trailer, that is launch the boat, it is backed into the water as shown in Figure 1. By unwinding winch 105, the boat plus its carriage 49 can move to a rearmost position enabling the boat to be floated therefrom. The unloading of a boat generally presents little or no problem when the trailer is fitted with a carriage such as my carriage 49, so that the boat operator can take advantage of deep and shallow water within which to float the boat from the trailer.

A motor with battery connection may be attached on bracket to support 100 on winch to facilitate loading in place of manual operation with ropes and pulleys. To further aid power loading, an automatic coupling can be attached to upper part of forward end of cradle 67 and bow of boat.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a trailer which has a chassis and supports on which to mount the boat, the improvement comprising a carriage on said chassis, means on the carriage to support the keel portion of the boat while moving the boat onto the chassis, and means for guiding the stern part of the boat as the boat is moved with said carriage on the trailer chassis, said stern portion guiding means including an extensible beam, and a guide member on the boat and through which said beam is movable as the boat is moved onto said chassis, whereby the guiding of the boat may be commenced at a distance behind the chassis.

2. The trailer of claim 1 wherein there are means mounting said beam for pivotal movement, a frame to which said pivotally mounting means are connected, and adjustable means connecting said frame to said chassis.

3. The trailer of claim 2 wherein there are stanchions attached to said chassis on opposite sides thereof and between which the boat is adapted to pass, and said adjustable means are connected to said stanchions.

References Cited in the file of this patent
UNITED STATES PATENTS

| | | |
|---|---|---|
| 2,361,951 | Livermon | Nov. 7, 1944 |
| 2,700,480 | Triplett | Jan. 25, 1955 |
| 2,713,951 | Davies | July 26, 1955 |